US009898771B2

(12) United States Patent
Yu et al.

(10) Patent No.: US 9,898,771 B2
(45) Date of Patent: *Feb. 20, 2018

(54) SYSTEM AND METHOD FOR FACILITATING THE PURCHASE OF PRODUCTS DETERMINED TO BE USEFUL IN THE PERFORMANCE OF A TASK

(71) Applicant: Sears Brands, L.L.C., Hoffman Estates, IL (US)

(72) Inventors: James Yu, Hoffman Estates, IL (US); Jason Ruud, Hoffman Estates, IL (US); Greg Franczyk, Hoffman Estates, IL (US); Robert Roy, Hoffman Estates, IL (US); Brian Jordan, Hoffman Estates, IL (US); Tony Liu, Hoffman Estates, IL (US); Kelly Wical, Hoffman Estates, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,894

(22) Filed: Jul. 14, 2014

(65) Prior Publication Data

US 2014/0324634 A1    Oct. 30, 2014

Related U.S. Application Data

(63) Continuation of application No. 12/962,947, filed on Dec. 8, 2010, now Pat. No. 8,818,876.

(51) Int. Cl.
*G06Q 30/06* (2012.01)

(52) U.S. Cl.
CPC ..... *G06Q 30/0627* (2013.01); *G06Q 30/0631* (2013.01)

(58) Field of Classification Search
None
See application file for complete search history.

(56) References Cited

U.S. PATENT DOCUMENTS 7,249,708 B2  7/2007  McConnell et al.
7,376,591 B2  5/2008  Owens
(Continued)

OTHER PUBLICATIONS

Canadian Patent Office, Communication with extended Canadian search report, in Application No. 2,756,215, dated Nov. 27, 2015 (3 pages).

*Primary Examiner* — Russell S Glass
(74) *Attorney, Agent, or Firm* — McAndrews, Held & Malloy, Ltd.

(57) ABSTRACT

A retailer computer system facilitates the purchase of products that are determined to be useful in the performance of a task by presenting to a consumer a first user interface by which the consumer may select a task from a repository of tasks, each task stored in the repository of tasks having documented instructions, such as a recipe, for performing the task, by presenting in a web page the documented instructions of the selected task, by using one or more keywords within the documented instructions of the selected task to select at least one product from an electronic product catalog, the selected at least one product being one or more of a part, such as a recipe ingredient, and a tool, such as an appliance, usable in performing the task, and by presenting to the consumer a second user interface for allowing the consumer to purchase via use of an online retail channel the selected at least one product.

30 Claims, 6 Drawing Sheets

(56) References Cited

U.S. PATENT DOCUMENTS

| | | |
|---|---|---|
| 2002/0010637 A1 | 1/2002 | Lieu et al. |
| 2003/0004831 A1 | 1/2003 | Owens |
| 2009/0082894 A1 | 3/2009 | Pettus et al. |
| 2009/0234712 A1* | 9/2009 | Kolawa ................. G06Q 30/02 705/14.4 |
| 2010/0161439 A1* | 6/2010 | Hamilton, II .......... A63F 13/12 705/26.1 |

* cited by examiner

| Shop | Share | Solve | Sears | Kmart | CRAFTSMAN | Kenmore | LANDSEND | the great indoors | Sears Outlet | PartsDirect | mygofer i'm shopping: Kmart, 3443 W Addison Avenue    Chicago 11:36 am    | hi, Christopher | log out | myvoice ))

[What are you shopping for ?] [When do you want it ? ▽] [GO]    Lists  Orders  Alerts  Cart
quickshop ▽

| food & grocery | prescriptions | health & wellness | pet food & supplies | baby & nursery | savings center | more ▽ |

Hawaiian Chinese Slow Cooked Pork

"Super texas stable filled with delicious morsels of Alligator that will keep you warm during those winter months. Especially good with a slice of corn bead."

— 402

★★★☆☆
Average Rating by 1 votes
Saved by 1 cook

400 ingredients

| qty. | unit | item |
|---|---|---|
| 2 1/2 | tablespoons | paprika |
| 2 1/2 | pounds | bonless pork loin roast, cut into 1-inch strips |
| 1 | tablespoon | canola oil |
| 1 | (20 ounce) can | unsweetened pineapple chunks |
| 1 | medium | onion chopped |
| 1 | medium | green pepper, chopped |
| 1/4 | cup | cider vinegar |
| 3 | tablespoons | brown sugar |
| 3 | tablespoons | reduced-sodium soy sauce |
| 1 | tablespoon | worcestershire sauce |
| 1/2 | teaspoon | salt |
| 2 | tablespoons | corn starch |
| 1/4 | cup | cold water |
| -- | -- | Hot Cooked Rice |

406 directions xxxx xxx xxxxx xxx x xxxx xxxxx  xxxx xxx xxxxx xxx x xxxx xxxxx
xxxx xxx xxxxx xxx x xxxx xx
xxxx xxx xxxxx xxx x xxxx xxxxx  xxxx xxx xxxxx xxx x xxxx xxxxxx
xxxx xxx xxxxx xxx x xxxx xxxxx  xxxx xxx xxxxx xxx x xxxx xxxxx

— 404 xxxx xxx xxxxx xxx x xxxx xxxxx  xxxx xxx xxxxx xxx x xxxx xxxxx
xxxx xxx xxxxx xxx x xxxx xx  xxxx xxx xxxxx xxx x xxxx xx
xxxx xxx xxxxx xxx x xxxx xxxxx  xxxx xxx xxxxx xxx x xxxx xxxxxx
xxxx xxx xxxxx xxx x

[ Back to Edit ]              [ Save ]

| feedback | myvoice | our partners | services | policies | help & support |

FIG. 6

| Shop | Share | Solve | Sears | Kmart | CRAFTSMAN | Kenmore | LANDSEND | the great indoors | Sears Outlet | PartsDirect | mygofer

🏠 | hi, Christopher  🎤 | log out | myvoice 🔊 i'm shopping: Kmart, 3443 W Addison Avenue    Chicago 11:36 am

[What are you shopping for ?] [When do you want it ?▼] [GO]    📋 📄 ❗ 🛒
quickshop ▼    Lists Orders Alerts Cart

| food & grocery | prescriptions | health & wellness | pet food & supplies | baby & nursery | savings center | more ▼ |

Hawaiian Chinese Slow Cooked Pork

"Super texas stable filled with delicious morsels of Alligator that will keep you warm during those winter months. Especially good with a slice of corn bead."

← 402

★★★☆☆
Average Rating by 1 votes
Saved by 1 cook

☐ I cooked This    ☆ Favorite

| xxxxxxx | xx |
| xxxxx | xx xxxxx |
| xxxx xxxx | xx xxxxxx |
| xxxx xxxx | xx xxxxxx |

400 ingredients

Select: [All] [None] [Find All] [Add to Cart] [Add all to list ▼]

| i need | qty. | unit | item |
|---|---|---|---|
| ☐ | 2 1/2 | tablespoons | paprika |
| ☐ | 2 1/2 | pounds | boneless pork loin roast, cut into 1-in  406 |
| ☐ | 1 | tablespoon | canola oil |
| ☐ | 1 | (20 ounce) can | unsweetene |
| ☐ | 1 | medium | onion chopp |
| ☐ | 1 | medium | green pepp |
| [Find ▷] ☑ | 1/4 | cup | cider vinega |
| ☐ | 3 | tablespoons | brown sugar |
| ☐ | 3 | tablespoons | reduced-so |
| ☐ | 1 | tablespoon | worcestersh |
| ☐ | 1/2 | teaspoon | salt |
| ☐ | 2 | tablespoons | corn starch |
| ☐ | 1/4 | cup | cold water |
| ☐ | -- | -- | Hot Cooked |

412

🔍 countertop view
☐ save to recipe box +
🖨 print this recipe mygofer quicksearch    Close ○

[Cider Vinegar]    [Search] ← 602

Matching products by top recommended

🍾 Colavita Balsamic Vinegar, Aged, 17 fl oz (500 ml)  Qty: [1]  [Select]
$3.99                ▽ Save to list 💬

🍾 Colavita Balsamic Vinegar, Aged, 17 fl oz (500 ml)  Qty: [1]  [Select]
$3.99                ▽ Save to list 💬

🍾 Colavita Balsamic Vinegar, Aged, 17 fl oz (500 ml)  Qty: [1]  [Select]
$3.99                ▽ Save to list 💬

Emily's famous chili
Award winning texas directions
xxxx xxx xxxxx xxx x xxxx xxxxx   xxxx xxx xxxxx xxx x xxxx x
xxxx xxx xxxxx xxx x xxxx xx
xxxx xxx xxxxx xxx x xxxx xxxxxx  xxxx xxx xxxxx xxx x xxxx x
xxxx xxx xxxxx xxx x xxxx xxxxx   xxxx xxx xxxxx xxx x xxxx xxxxx
xxxx xxx xxxxx xxx x xxxx xx   xxxx xxx xxxxx xxx x xxxx xx
xxxx xxx xxxxx xxx x xxxx xxxxxx  xxxx xxx xxxxx xxx x xxxx xxxxxx
xxxx xxx xxxxx xxx x ← 404

414    408 cook's tools ─────────────

🔨 $29.99    🥣 $9.99    📦 $45.99    📦 $4.85    🫕 $5.99    ▷

| feedback | myvoice | our partners | services | policies | help & support |

SYSTEM AND METHOD FOR FACILITATING THE PURCHASE OF PRODUCTS DETERMINED TO BE USEFUL IN THE PERFORMANCE OF A TASK

CROSS-REFERENCE TO RELATED APPLICATIONS/INCORPORATION BY REFERENCE

The present application is a continuation of U.S. patent application Ser. No. 12/962,947, filed Dec. 8, 2010. The above-identified application is hereby incorporated herein by reference in its entirety.

BACKGROUND

The subject invention generally relates to online retail services and, more particularly, relates to a system and method for facilitating the purchase of products that are determined to be useful in the performance of a task, such as ingredients, appliances, and/or utensils that might be used in connection with a cooking recipe.

U.S. Pat. No. 7,376,591 ("the '591 patent), issued on May 20, 2008 to Owens, describes a method and system for interactively shopping for groceries, especially on an Internet web site, where the user may create a shopping list, shop for items from the list at a selected grocery store, arrange for pick up or delivery of the selected items and payment, or download a created shopping list to a PDA (possibly for printing) for use in the store. Users are required to register and provide specific demographic information (which is useful to manufacturers and stores) to be eligible to receive the benefits of use of the web site, such as menu creation, coupon downloads, menu planning, and recipe input. Shopping lists may be created from a single input screen using standard language text, and products added to the shopping list may be automatically suggested to the user based on a best regular price or retailer's specials. Recipes entered by the user may also be altered to meet numbers of servings or dietary requirements with any changes being stored for future use.

While the '591 patent, which is incorporated herein by reference in its entirety, generally describes a system in which a user may create personal recipes and/or modify any recipe to suit their needs, the subject system and method provides a much needed improvement thereto.

SUMMARY

Described hereinafter is a system and method for facilitating the purchase of products that are determined to be useful in the performance of a task. By way of example only and without limitation, the products may be ingredients, appliances, and/or utensils that might be used in connection with a documented task, such as a cooking recipe.

More particularly, a retailer computer system facilitates the purchase of products that are determined to be useful in the performance of a task by presenting to a consumer a first user interface by which the consumer may select a task from a repository of tasks, each task stored in the repository of tasks comprising documented instructions, such as a recipe, for performing the task, by presenting in a web page the documented instructions of the selected task, by using one or more keywords within the documented instructions of the selected task to select at least one product from an electronic product catalog, the selected at least one product being one or more of a part, such as a recipe ingredient, and a tool, such as an appliance, usable in performing the task, and by presenting to the consumer a second user interface for allowing the consumer to purchase the selected at least one product.

While the forgoing provides a general overview of some of the various features and functionalities of the subject invention, a better understanding of the objects, advantages, features, properties, and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which:

FIG. 3 illustrates an exemplary web page used to access a repository of tasks;

FIG. 4 illustrates an exemplary web page for displaying instructions of a selected task;

FIG. 6 illustrates the exemplar web page of FIG. 5 additionally showing product information related to a user selected part useful in the performance of the selected task.

DETAILED DESCRIPTION

Figure 1:
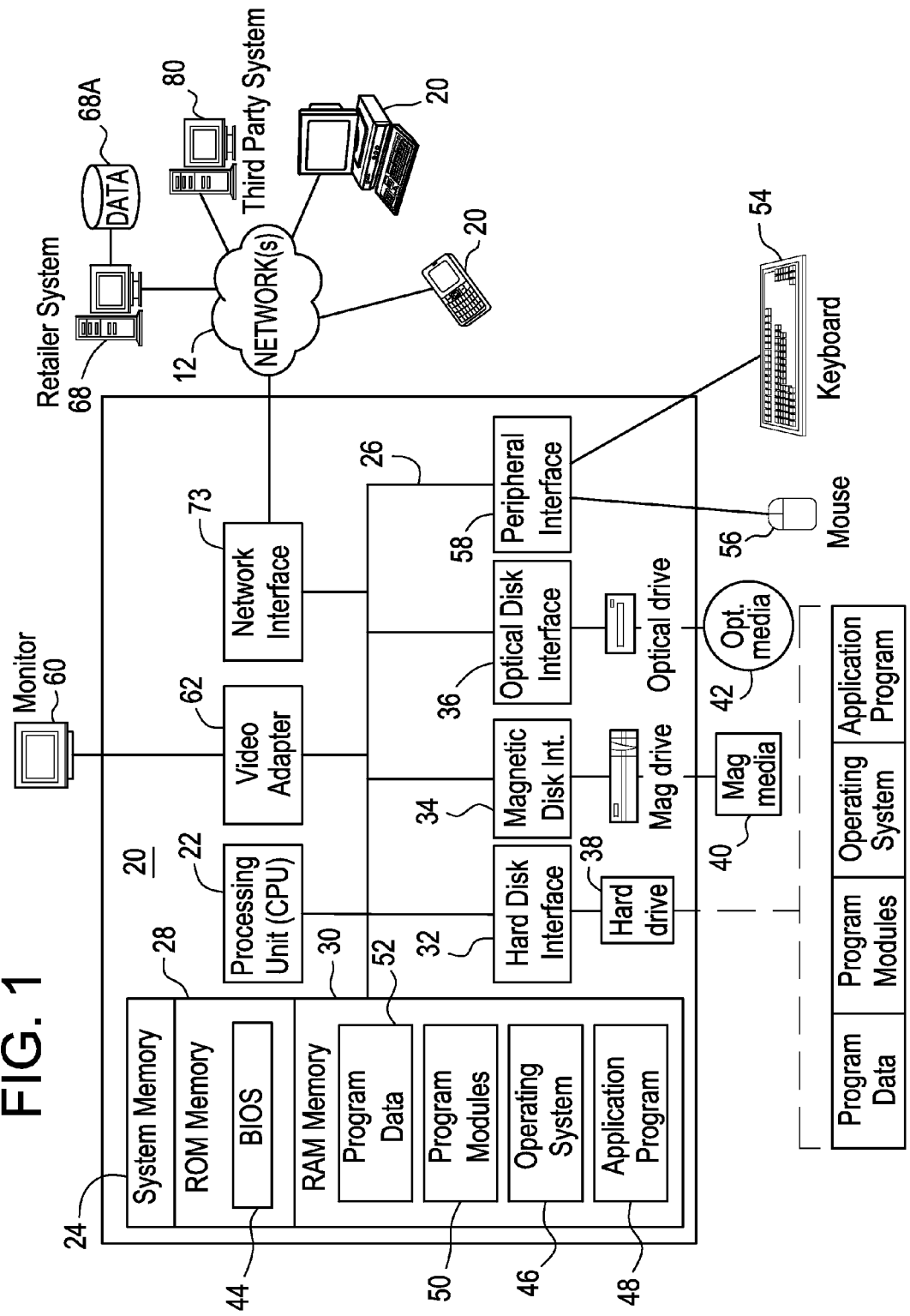
FIG. 1 illustrates in block diagram form components of an exemplary system for facilitating the purchase of products that are determined to be useful in the performance of a task.
Figure 2:
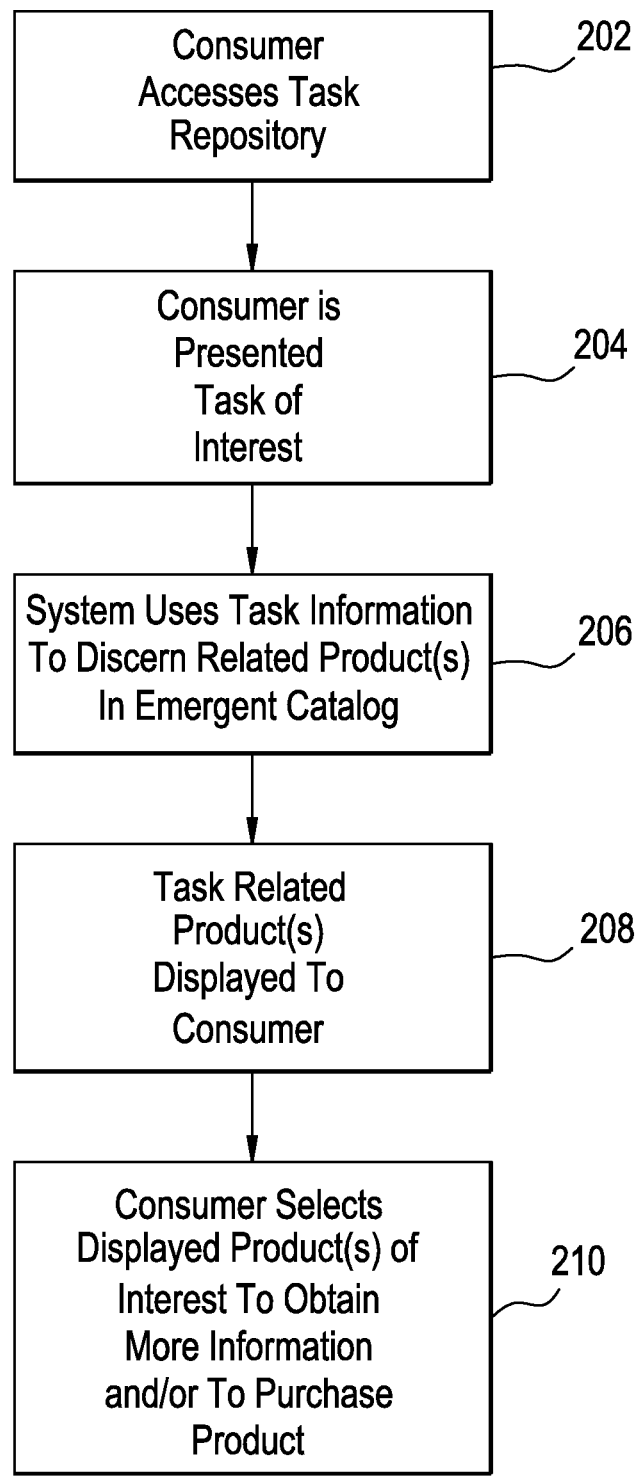
FIG. 2 illustrates a flow chart of exemplary steps for facilitating the purchase of products that are determined to be useful in the performance of a task.

With reference to the figures, the following describes a system and method for facilitating the purchase of products that are determined to be useful in the performance of a task. To this end, an exemplary system, illustrated in FIG. 1, includes a processing device 20 whereby a purchaser may access an online retail channel hosted by a retailer system 68 to, among other things, view and purchase product being offered for sale by a retailer. In addition, a purchaser may access the online retail channel hosted by the retailer system 68 to create and/or upload a written or documented representation of a task, e.g., cooking recipe instructions, repair instructions, do-it-yourself project instructions, or the like. While illustrated in the exemplary form of a personal computer, it is to be understood that the processing device 20 may be embodied in any type of device having the ability to execute instructions such as, by way of example only, a personal-digital assistant ("PDA"), a cellular telephone, or the like. Furthermore, while described and illustrated in the context of a single processing device 20, those skilled in the art will also appreciate that the various tasks described herein may be practiced in a distributed environment having multiple processing devices linked via a local or wide-area network, such as the Internet, whereby the executable instructions may be associated with and/or executed by one or more of the multiple processing devices.

More particularly, to provide a means for a purchaser to access the online retail channel (and to perform various tasks as necessary) the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated physically embodied, i.e., non-transitory, computer-readable media allow for the storage of instructions, data structures, program modules, and the like for execution by the processing unit 22 of the processing device 20. Those skilled in the art will further appreciate that other types of physically embodied computer-readable media that can store data and/or executable instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories. Meanwhile, the program modules that may be stored in one or more of the memory/media devices may include a basic input/output system (BIOS) 44 which contains the basic routines that help to transfer information between elements within the processing device 20, such as during start-up, an operating system 46, one or more applications programs 48 (such as a Web browser), other program modules 50, and/or program data 52.

To allow a purchaser to enter commands and information into the processing device 20, e.g., to create or upload task related instructions, to search for and purchase product, indicate how an order for product is to be fulfilled, etc., input devices such as a touch pad or keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As noted above, the processing device 20 may also utilize logical connections to one or more remote processing devices, such as a retailer system 68 having associated data repository 68A. As will be understood, the data repository 68A may maintain a database of product that is being sold by the retailer, e.g., an emergent catalog, purchaser information (including information concerning past checkout experiences of particular purchasers), financial information, and the like type of data used in commerce. While the retailer system 68 has been illustrated in the exemplary form of a server computer, it will be appreciated that the retailer system 68 may, like processing device 20, be any type of device having processing capabilities. Similarly, it will be appreciated that the retailer system 68 need not be implemented as a single device but may be implemented in a manner such that the tasks performed by the retailer system 68 are distributed amongst a plurality of processing devices/databases located at the same or different geographical locations and linked through a communication network. Additionally, the retailer system 68 may have logical connections to other systems third party systems 80 via the network 12 and, via such connections, will be associated with functions that are supported by and data repositories that are linked to such other third party systems. Such third party systems may include, without limitation, systems of banking, credit, or other financial institutions, systems of third party providers of product, systems of shipping/delivery companies, systems that support social networking, etc.

For performing tasks as needed, the retailer system 68 may include many or all of the elements described above relative to the processing device 20. In addition, the retailer system 68 would generally include executable instructions that are likewise stored on physically embodied memory devices for, among other things, supporting online retail channel services, supporting physical retail channel POS services, maintaining records, etc. To this end, the retailer system 68 may additionally include links to point-of-sale devices, e.g., cash registers, that are located within one or more retail stores and the like without limitation. As will also be described in greater detail hereinafter, the retailer system 68 further has instructions for facilitating the purchase of products that are determined to be useful in the performance of a documented task, e.g., to present in connection with task instructions one or more products that are determined by the system to be useful in the performance of the task whereby the presented product(s) can be easily added to a shopping cart, a wish list, or the like by a consumer (such actions being individually and collectively referred to herein as a "purchase" of a product for the sake of convenience).

Communications between the processing device 20 and the retailer system 68 may be exchanged via a further processing device, such as a network router, that is responsible for network routing. Communications with the network router may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) associated with the retailer system 68.

As noted above, the retailer system 68 includes instructions for facilitating the purchase of products that are determined to be useful in the performance of a documented task. By way of example only and without limitation, the system may function to present to a purchaser products, such as ingredients, appliances, and/or utensils, that might be used in connection with a documented cooking recipe. To this end, the retailer system 68 may maintain, for example in data repository 68A, or otherwise have access to a collection of written and/or illustrated, i.e., documented, task instructions, such as recipes, which are made accessible to a consumer for viewing using conventionally known techniques, e.g., they may be searched using keywords, drill down searching techniques, etc. The documented task instructions stored in the data repository 68A may be generated by the retailer, may be uploaded to the retailer system 68 by consumers, may be generated by consumers using tools provided by the retailer system 68, and the like without limitation. In addition, the retailer system 68 may also maintain, for example in data repository 68A, or otherwise have access to information concerning product that the retailer currently has in stock (in one or more warehouses and/or retailer locations), will have in stock (in one or more warehouses and/or retailer locations), and/or can obtain for delivery (to one or more retailer locations or directly to a consumer) or which may be purchased from one or more third parties, i.e., an electronic product catalog. For reasons that will become apparent, this product information will preferably include for each such product a location of the product, price of the product, keyword descriptors of the product (e.g., nouns associated with the product), and keyword descriptors of uses of the product (e.g., verbs associated with the product). In addition, the system may maintain historical task and product related information, such as information that associates a task that was being viewed concurrently with a past product purchase, that associates a task that was being viewed during the same browsing session as a past product purchase, that associates a task that was being viewed within a predetermined period of time before a past product purchase, and/or the like type of association information.

Figure 3:
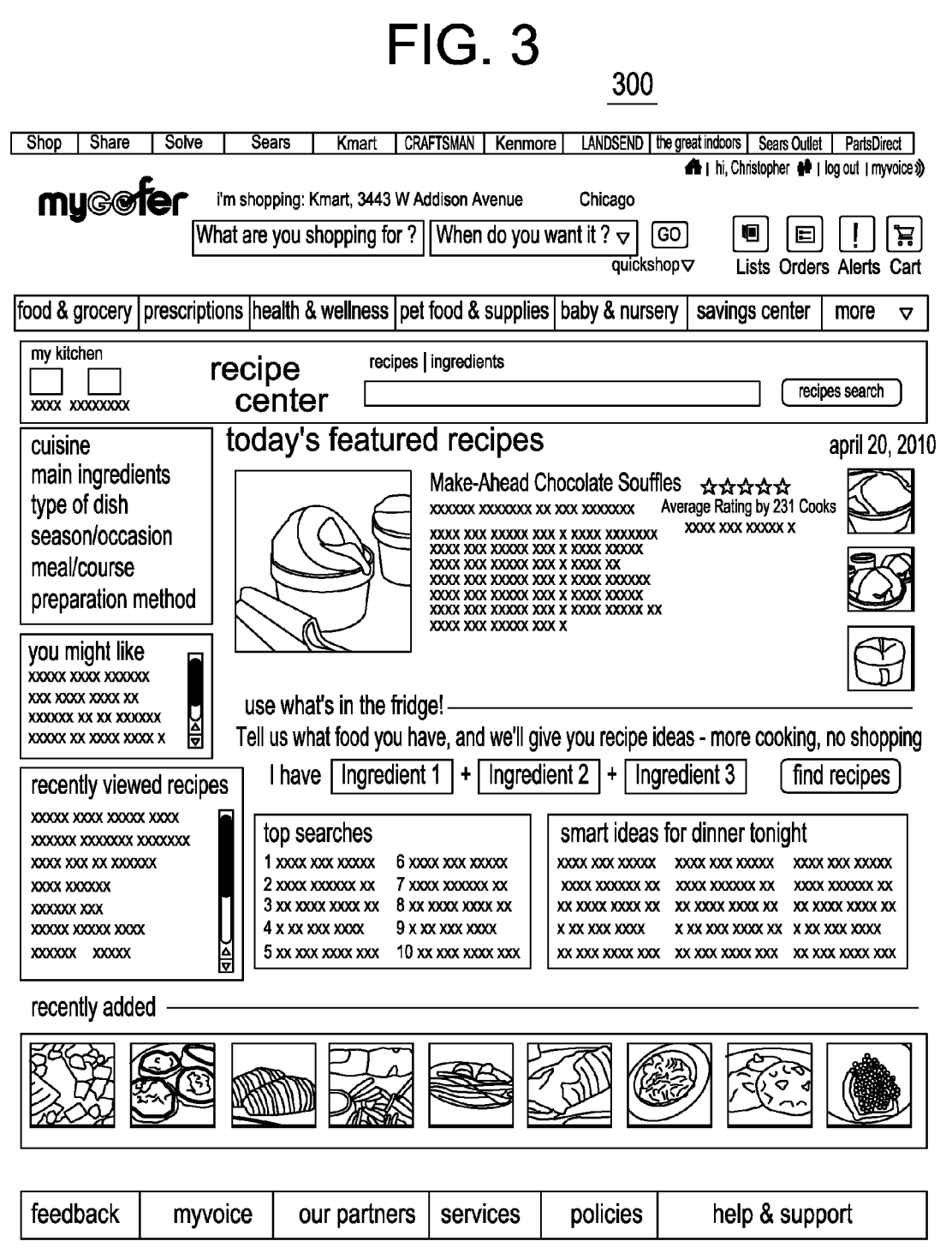

By way of more particular example and with reference to FIGS. 2-6, a consumer first accesses a page associated with the task repository 202, such as the "recipe center" page 300 shown in FIG. 3, whereupon the consumer may interact with the retailer system 68, for example via one or more search functions offered in connection with the task repository page 300, to locate 204 a task page of particular interest, such as the task page 400 showing a recipe for "Hawaiian Chinese Slow Cooked Pork." As seen in FIG. 4, the task page 400 provides documented instructions that are to be used in the performance of the consumer selected task. In the illustrated example, the documented instructions include an image 402, textual directions 404, and a textual and/or pictorial list of parts, e.g., ingredients 406, that are to used in the performance of the task.

Figure 5:
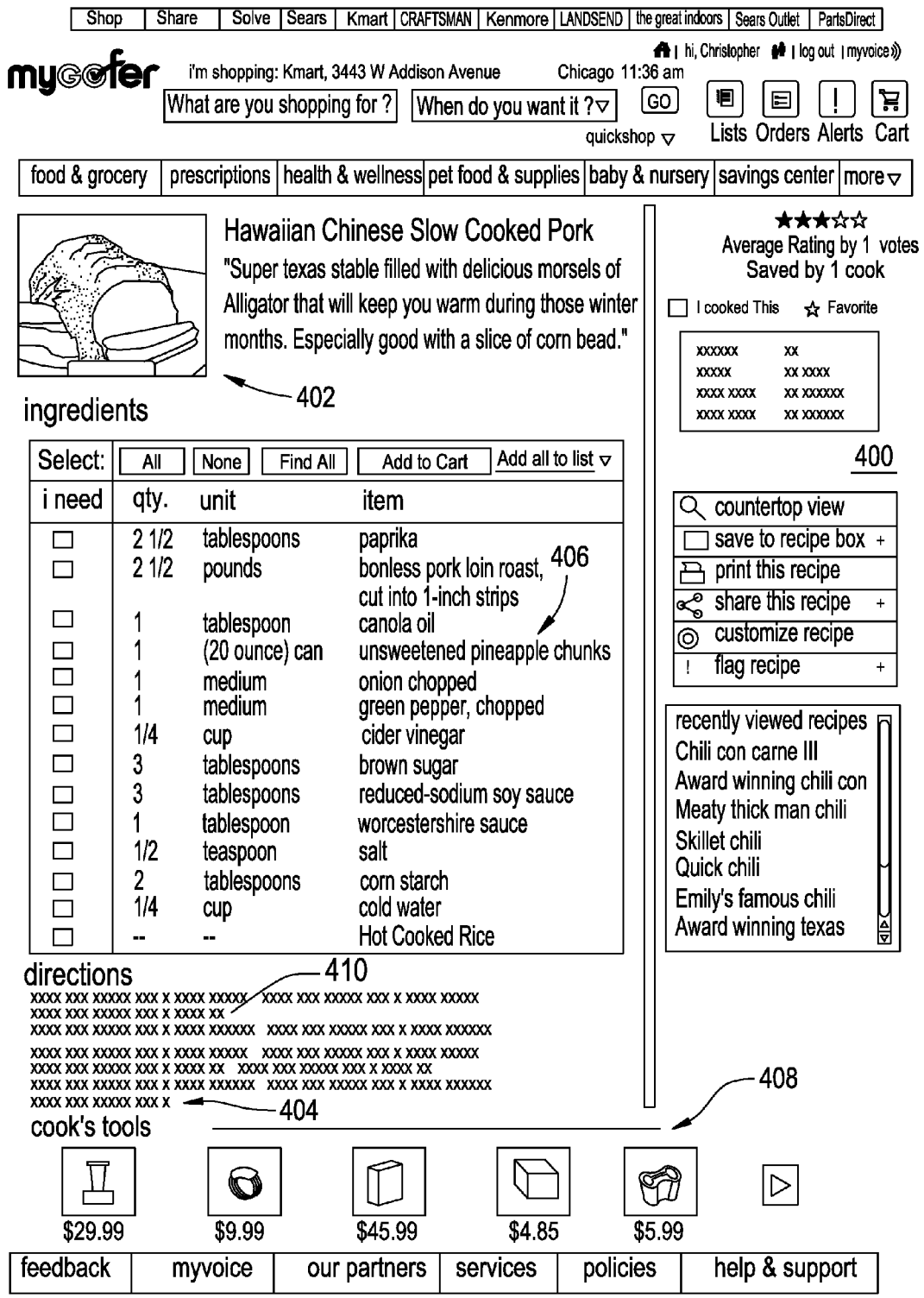
FIG. 5 illustrates the exemplary web page of FIG. 4 additionally showing tools discerned to be useful in the performance of the selected task.

In certain circumstances, the task page 400 may additionally present to the consumer a textual and/or pictorial list of tools, e.g., cooking appliances 408, that may be used in the performance of the task such as illustrated in FIG. 5. To discern which tools should be presented to the consumer on a task page 400, the retailer system 68 may analyze or parse the documented instructions (which parsing step may be done prior to or in connection with an instruction to display the task page 400) to located relevant keywords, e.g., nouns and/or verbs, which relevant keywords may then be used to locate product within the electronic product catalog (with at least the locating step being preferably done in connection with the instruction to display the task page 400) that have been associated with one or more of the same or similar, i.e., synonymous, keywords. By way of example only, considering task instructions that use the keyword "combine" (possibly further considering the use of this keyword near keywords known to be product in the form of ingredients, e.g., "cornstarch" and "water"), the retailer system 68 would function to select product such as the blenders or mixer shown on page 500 (which products would preferably be associated with keywords such as "combine," "blend," "mix," and/or the like in the electronic product catalog) as being possible, relevant tools for the task instructions provided. Similarly, considering instructions that use the keyword "juice" (possibly further considering the use of this keyword near a keyword known to be product in the form of ingredients, e.g., "pineapple"), the retailer system 68 may further select product such as the juicers shown of page 500 (which products would preferably be associated with keywords such as "juice," "extract," and/or the like in the electronic product catalog) as being possible, relevant tools for the task instructions provided. Because the electronic product catalog is preferably emergent, i.e., dynamically updated in near real time via use of various inventory management tools, the product 408 presented to the consumer in this manner is preferably product that the retailer currently has available for sale to the consumer. As such, it will be appreciated that consumers accessing the same task at different times may be provided with a different scope of task related product depending upon current product availability, inventory, and the like. Furthermore, as numerous product may be discerned/selected as being related to a given task, the task related products that are ultimately presented to the consumer may additionally be limited to those that have a history of being purchased in the past for the selected task, that have the highest level (or age) of inventory (e.g., to move the product), that fall within a predetermined price range (e.g., one specified by the consumer), that are available at a given location (e.g., one specified by the consumer for pickup), that have a given consumer rating, etc. so as not to overwhelm the consumer with too much product information and/or to present the consumer with product that is most likely to lead to a purchase thereof.

In still further circumstances, it is contemplated that a consumer may be provided with the ability to interact with tool related keywords 410 located within the instructions, e.g., to click on those keywords, which keywords would preferably be presented to the consumer in a distinct manner—such as through use of underlining or colors—within the instructions, to thereby cause a pop-up window, a new page, etc. to be presented to the consumer by which the consumer can access further information for product related to those keywords. By way of example only, the system discerned keyword "slow cooker" in the directions 404 illustrated in FIG. 5 may be selected by a consumer, e.g., clicked upon, whereupon the consumer selected keyword would be provided to the retailer system 68 and used as a search term against the electronic product catalog to thereby present the consumer, e.g., in a pop-up window, new web page, etc., with product stored in the electronic product catalog that is associated with the "slow cooker" or a similar, i.e., synonymous, keyword.

In a similar manner, is contemplated that a consumer may be provided with the ability to interact with parts related keywords 412, e.g., ingredients, as located within the instructions, e.g., to click on those keywords, which keywords would preferably be presented in a distinct manner—such as through the use of underlining or colors—within the instructions, to thereby cause a pop-up window 414, a new page, etc. to be presented to the consumer by which the consumer can access further information for product related to those keywords. By way of example only, the system discerned keyword "cider vinegar" in the directions 404 illustrated in FIG. 6 may be selected by a consumer, e.g., clicked upon or an associated "find" icon clicked upon, whereupon the consumer selected keyword would be provided to the retailer system 68 and used as a search term against the electronic product catalog to thereby present the consumer, e.g., in a pop-up window 414, new web page, etc., with product stored in the emergent catalog that is associated with the "cider vinegar" or similar, i.e., synonymous, keyword.

As further illustrated in FIG. 6, in connection with the presentation of product information to the consumer, the consumer may be provided with the ability to further refine the product presented, e.g., via use of a further provided search function 602, and/or to select presented product for purchase. As the elements of the system that would be used to facilitate purchase of product, e.g., for shipment, delivery, and/or pickup, for adding to a wish list, etc., is described in commonly assigned U.S. application Ser. No. 12/539,219, filed on Aug. 11, 2009, which application is incorporated herein by reference it its entirety, such elements will not be described herein for the sake of brevity.

While various concepts have been described in detail, it will be appreciated by those skilled in the art that modifications and alternatives to those concepts could be developed in light of the overall teachings of the disclosure. For example, those of skill in the art will appreciate that the ordering of the steps described herein and illustrated in the figures can be modified without departing from the scope of the invention claimed hereinafter. Similarly, those of skill the art will appreciate that certain of the steps described herein may be considered to be optional. Yet further, while various aspects of the invention have been described in the context of functional modules and components, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person knowledgeable in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A method comprising:
    presenting, at a user interface of a web page, a recipe;
    parsing, by a processing device, the recipe presented in the web page to locate one or more keywords related to one or both of an ingredient usable in the recipe presented in the web page and a tool usable to perform the recipe presented in the web page;
    selecting, by the processing device, the one or both of the ingredient and the tool from an electronic product catalog based on the one or more keywords within the recipe and inventory information associated with ingredients and tools in the electronic product catalog, wherein the inventory information in the electronic product catalog is configured to be dynamically updated;
    presenting the selected one or both of the ingredient usable in the recipe presented in the web page and the tool usable to perform the recipe presented in the web page at the user interface facilitating purchase of the selected one or both of the ingredient and the tool; and
    presenting, in the web page, a selectable image of the selected one or both of the ingredient and the tool, wherein the selectable image comprises a part of the user interface.

2. The method of claim 1, comprising placing the selected one or both of the ingredient and the tool into an electronic shopping cart based on a user input at the user interface.

3. The method of claim 1, comprising placing the selected one or both of the ingredient and the tool into an electronic wish list based on a user input at the user interface.

4. The method of claim 1, wherein the recipe comprise a selectable link, wherein activation of the selectable link provides the one or more keywords used to select the one or both of the ingredient and the tool from the electronic product catalog, and wherein information relevant to the selected one or both of the ingredient and the tool which includes the user interface is presented in response to activation of the selectable link.

5. The method of claim 4, wherein the information relevant to the selected one or both of the ingredient and the tool is presented in a further web page.

6. The method of claim 4, wherein the information relevant to the selected one or both of the ingredient and the tool is presented in a pop-up window.

7. The method of claim 1, wherein the electronic product catalog is an emergent catalog.

8. The method of claim 1, comprising populating a recipe repository based at least in part with recipes uploaded by consumers to a retailer computer system.

9. The method of claim 1, comprising receiving recipes created by customers at a retailer computer system for storage in a recipe repository.

10. The method of claim 1, comprising displaying, in the web page, the selected one or both of the ingredient and the tool from the electronic product catalog with the recipe.

11. The method of claim 10, wherein the displayed selected one or both of the ingredient and the tool from the electronic product catalog comprises a product having a history of being purchased in the past for the recipe.

12. The method of claim 10, wherein the displayed selected one or both of the ingredient and the tool from the electronic product catalog comprises a product having a predetermined inventory level.

13. The method of claim 10, wherein the displayed selected one or both of the ingredient and the tool from the electronic product catalog comprises a product having a predetermined inventory age.

14. The method of claim 10, wherein the displayed selected one or both of the ingredient and the tool from the electronic product catalog comprises a product having a predetermined inventory location.

15. The method of claim 10, wherein the displayed selected one or both of the ingredient and the tool from the electronic product catalog comprises a product having a predetermined consumer rating.

16. A retailer computer system comprising:
    at least one processing device configured to:
        parse a recipe presented in a web page to locate one or more keywords related to one or both of an ingredient usable in the recipe presented in the web page and a tool usable to perform the recipe presented in the web page;
        select the one or both of the ingredient and the tool from an electronic product catalog based on the one or more keywords within the recipe and inventory information associated with ingredients and tools in the electronic product catalog, wherein the inventory information in the electronic product catalog is configured to be dynamically updated; and
        present the selected one or both of the ingredient usable in the recipe presented in the web page and the tool usable to perform the recipe presented in the web page at a user interface facilitating purchase of the selected one or both of the ingredient and the tool, wherein the user interface comprises a part of the web page in which the recipe is presented, wherein the web page presents a selectable image of the selected one or both of the ingredient and the tool, and wherein the selectable image comprises a part of the user interface.

17. The system of claim 16, wherein the user interface comprises elements for allowing the consumer to place the selected one or both of the ingredient and the tool into an electronic shopping cart.

18. The system of claim 16, wherein the user interface comprises elements for allowing the consumer to place the selected one or both of the ingredient and the tool into an electronic wish list.

19. The system of claim 16, wherein the recipe comprises a selectable link, wherein activation of the selectable link is used to provide the one or more keywords used to select the one or both of the ingredient and the tool from the electronic product catalog, and wherein information relevant to the selected one or both of the ingredient and the tool which includes the user interface is presented in response to activation of the selectable link.

20. The system of claim 19, wherein the information relevant to the selected one or both of the ingredient and the tool is presented in a further web page.

21. The system of claim 19, wherein the information relevant to the selected one or both of the ingredient and the tool is presented in a pop-up window.

22. The system of claim 16, wherein the electronic product catalog is an emergent catalog.

23. The system of claim 16, comprising a recipe-repository, wherein the recipe repository is populated at least in part with recipes uploaded by consumers to the retailer computer system.

24. The system of claim 16, comprising a recipe repository, wherein the retailer computer system provides a tool for allowing consumers to create recipes for storage in the recipe repository.

25. The system of claim 16, wherein the selected one or both of the ingredient and the tool from the electronic product catalog is displayed in the web page with the recipe.

26. The system of claim 25, wherein the displayed selected one or both of the ingredient and the tool from the electronic product catalog comprises a product having a history of being purchased in the past for the task.

27. The system of claim 25, wherein the displayed selected one or both of the ingredient and the tool from the electronic product catalog comprises a product having a predetermined inventory level.

28. The system of claim 25, wherein the displayed selected one or both of the ingredient and the tool from the electronic product catalog comprises a product having a predetermined inventory age.

29. The system of claim 25, wherein the displayed selected one or both of the ingredient and the tool from the electronic product catalog comprises a product having a predetermined inventory location.

30. The system of claim 25, wherein the displayed selected one or both of the ingredient and the tool from the electronic product catalog comprises a product having a predetermined consumer rating.

* * * * *